United States Patent [19]
Barer et al.

[11] 3,920,832
[45] Nov. 18, 1975

[54] N-CHLORO CARBAMATES AS INSECTICIDES AND FUNGICIDES

[76] Inventors: Sol J. Barer, 18-01 Fox Run Drive, Plainsboro, N.J. 08536; Richard F. Stockel, 475 Rolling Hills Road, Bridgewater Township, N.J. 08876; Jaroslav Vit, 40 Partridge Run, Belle Mead, N.J. 08536

[22] Filed: Apr. 18, 1974

[21] Appl. No.: 462,113

[52] U.S. Cl. ............................................ 424/300
[51] Int. Cl.² ........................................ A01N 9/20
[58] Field of Search ............................... 424/300

[56] References Cited
UNITED STATES PATENTS

| | | | |
|---|---|---|---|
| 2,920,994 | 1/1960 | Epperly et al. | 424/300 |
| 3,203,853 | 8/1965 | Jager et al. | 424/300 |

OTHER PUBLICATIONS
Chemical Abstracts, Vol. 56 (1962), p. 4653i.

*Primary Examiner*—V. D. Turner
*Attorney, Agent, or Firm*—Cushman, Darby & Cushman

[57] ABSTRACT

Compounds of the formula:

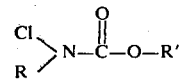

where R is chlorine, hydrogen or alkyl of 1 to 6 carbon atoms and R' is alkyl of 1 to 6 carbon atoms, are useful as biocides, especially as fungicides and ovacides.

12 Claims, No Drawings

N-CHLORO CARBAMATES AS INSECTICIDES AND FUNGICIDES

The present invention is directed to the use of N-chloro carbamates as pesticides.

Foglia et al., *J. Org. Chem. Vol.* 33 (1968), page 766, discloses the use of N,N-dichlorourethane (N,N-dichloro ethyl carbamate), as reacting with unsaturated compounds and Schrage, *Tetrahedron Vol.* 23 (1967), page 3033, shows addition of N-chlorourethane (N-chloro ethyl carbamate) to bicyclo(2,2,1)-ieptene-2.

There is no mention in the literature, however, that such compounds have physiological activities.

Some unchlorinated carbamates have been employed as insecticides but they are of complex structure, e.g., Carbaryl or Sevin which is N-methyl phenyl carbamate of the formula

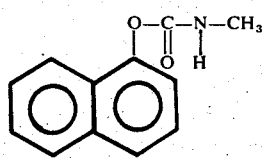

Ethyl carbamate itself has some germicidal properties and also has been used in cancer chemiotherapy.

It has now been found that N-chlorocarbamates of the formula

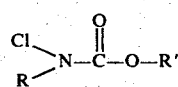

where R is chlorine, hydrogen or alkyl of 1 to 6 carbon atoms, preferably chlorine, hydrogen or alkyl of 1 to 2 carbon atoms; and wherein R' is alkyl or 1 to 6 carbon atoms, preferably alkyl of 1 to 4 carbon atoms are useful as pesticides especially as fungicides and insecticides. As insecticides they are particularly useful as ovacides, i.e., as toxicants for insect eggs.

As N-chlorocarbamates there can be used methyl N,N-dichlorocarbamate, ethyl N-chlorocarbamate, ethyl N-chlorocarbamate, ethyl N,N-dichlorocarbamate, propyl N,N-dichlorocarbamate, propyl N-chlorocarbamate, isopropyl N,N-dichlorocarbamate, butyl N,N-dichlorocarbamate, butyl N-chlorocarbamate, isobutyl N,N-dichlorocarbamate, sec. butyl N-chlorocarbamate, sec. butyl N,N-dichlorocarbamate, amyl N,N-dichlorocarbamate, amyl N,-chlorocarbamate, hexyl N,N-dichlorocarbamate, hexyl N-chlorocarbamate, ethyl N-chloro-N-methyl-carbamate, ethyl N-chloro-N-ethyl-carbamate, ethyl N-chloro-N-propyl-carbamate, ethyl N-chloro-N-butyl-carbamate, methyl N-chloro-N-hyxyl-carbamate, methyl N-chloro-N-methyl-carbamate, butyl N-chloro-N-methyl-carbamate, propyl N-chloro-N-methyl-carbamate, sec. butyl N-chloro-N-ethyl-carbamate, methyl N-chloro-N-ethyl-carbamate.

The compounds can be prepared by reacting the appropriate carbamate with the appropriate alkyl hypochlorite. Thus, there can be used methyl carbamate, ethyl carbamate, propyl carbamate, butyl carbamate, isopropyl carbamate, sec. butyl carbamate, amyl carbamate, hexyl carbamate, isobutyl carbamate, methyl N-methyl-carbamate, ethyl N-methyl-carbamate, butyl N-methyl-carbamate, hexyl N-methyl-carbamate, methyl N-ethyl-carbamate, ethyl N-ethyl-carbamate, propyl N-ethyl-carbamate, butyl N-ethyl-carbamate, methyl N-propyl-carbamate, methyl N-butyl-carbamate and ethyl N-hexyl-carbamate. There can be used as hypochlorites for example methyl hypochlorite, ethyl hypochlorite, propyl hypochlorite, isopropyl hypochlorite, t-butyl hypochlorite, t-amyl hypochlorite.

The products of the present invention can be used alone or they can be applied together with inert solids to form dusts, or can be suspended in a suitable liquid diluent, e.g., organic solvents or water.

There can also be added surface active agents or wetting agents and/or inert solids in the liquid formulations. In such case, the active ingredient can be from 0.01 to 95 percent by weight of the entire composition.

As organic solvents there can be employed hydrocarbons, e.g., benzene, toluene, xylene, kerosene, diesel fuel, fuel oil, and petroleum naphtha, ketones such as acetone, methyl ethyl ketone and cyclohexanone, chlorinated hydrocarbons such as carbon tetrachloride, chloroform, trichloroethylene, and perchloroethylene, esters such as ethyl acetate, amyl acetate and butyl acetate, ethers, e.g., ethylene glycol monomethyl ether and diethylene glycol monomethyl ether, alcohols, e.g., methanol, ethanol, isopropanol, amyl alcohol, ethylene glycol, propylene glycol, butyl carbitol acetate and glycerine, mixtures of water and organic solvents, either as solutions or emulsions, can be employed.

The novel products can also be applied as aerosols, e.g., by dispersing them in air by means of a compressed gas such as dichlorodifluoromethane or trichlorofluoromethane and other Freons and Genetrons, for example.

The products of the present invention can also be applied with adjuvants or carriers such as talc, pyrophyllite, synthetic fine silica, attapulgus clay, kieselguhr, chalk, diatomaceous earth, lime, calcium carbonate, bentonite, fuller's earth, cottonseed hulls, wheat flour, soybean flour, pumice, tripoli, wood flour, walnut shell flour, redwood flour and lignin.

As stated, it is frequently desirable to incorporate a surface active agent in the compositions of the present invention. Such surface active or wetting agents are advantageously employed in both the solid and liquid compositions. The surface active agent can be anionic, cationic or nonionic in character. When a surface active agent is present, it is usually employed in an amount of 0.05 – 1% by weight.

Typical classes of surface active agents include alkyl sulfonate salts, alkylaryl sulfonate salts, alkylaryl polyether alcohols, fatty acid esters of polyhydric alcohols and the alkylene oxide addition products of such esters and addition products of long chain mercaptans and alkylene oxides. Typical examples of such surface active agents include the sodium alkylbenzene sulfonates having 10 to 18 carbon atoms in the alkyl group, alkylphenol ethylene oxide condensation products, e.g., p-isooctylphenol condensed with 10 ethylene oxide units, soaps, e.g., sodium stearate and potassium oleate, sodium salt of propylnaphthalene sulfonic acid, di(2-ethylhexyl) ester of sodium sulfosuccinic acid, sodium lauryl sulfate, sodium decane sulfonate, sodium salt of the sulfonated monoglyceride of coconut fatty acids, sorbitan sesquioleate, lauryl trimethyl ammonium chloride, octadecyl trimethyl ammonium chloride, polyethylene glycol lauryl ether, polyethylene glycol esters of fatty acids and rosin acids, e.g., Ethofat 7 and 13, sodium N-methyl-N-oleyl taurate, Turkey Red Oil, sodium dibutyl naphthalene sulfonate, sodium lignin sulfonate, polyethylene glycol stearate, sodium dodecylbenzene sulfonate, tertiary dodecyl polyethylene glycol thioether (Nonionic 218), long chain ethylene oxide-propylene oxide condensation products, e.g., Pluronic 61 (molecular weight 1000), polyethylene glycol ester of tall oil acids, sodium octyl phenoxyethoxyethyl sulfate, tris(polyoxyethylene) sorbitan monostearate (Tween 60), and sodium dihexyl sulfoxuccinate.

The solid and liquid formulations can be prepared by any of the conventional procedures. For example, the compounds of the present invention can be applied to soil, growing plants, e.g., trees, cotton plants, wheat and other grain plants, vegetable plants, seeds, fabrics, etc., to give pesticidal protection.

When applied to crops the compounds can be employed in widely varying amounts, e.g., 1 to 100 lbs/acre, usually between 2 and 25 lbs/acre. The compounds should be applied to the pest in a biocidally effective amount, e.g., they should be applied to fungi in a fungicidally effective amount and to insects in an insecticidally effective amount.

EXAMPLE 1

The compounds employed in the present invention for example can be prepared in the manner described below for preparing ethyl N-chloro carbamate.

89 grams of ethylcarbamate (urethane) were dissolved in 1.5 liters of $CH_2Cl_2$, the temperature of the solution lowered to 0° C and 125 ml tertiary-butyl hypochlorite added dropwise with the stirring. After completion of the addition the solution was allowed to come to room temperature and stirred overnight. The solvent was stripped off via vacuum to yield 97% pure N-chloroethyl carbamate.

EXAMPLE 2

Fungicidal Activity:

Ethyl N,N-dichloro carbamate and ethyl N-chloro carbamate were blended with dry soil and tested for their efficacy against Bean Root Rot (*Fusarium solani*, host plant *Phaseolus vulgaris*). Efficacy of ethyl N-chloro-carbamate and ethyl N,N-dichloro-carbamate applied as soil mixes for control of *Fusarium solani*:

| Compound | % Disease Control-Lbs. Per Acre | | | |
|---|---|---|---|---|
| | 50 | 25 | 12 | 6 |
| ethyl N,N-dichloro-carbamate | 41 | 45 | 32 | 32 |
| ethyl N-chloro-carbamate | 91 | 80 | * | 34 |
| Captan (commercial Standard) (N-trichloromethyl thio-4-cyclohexene-1,2-dicarboximide) | 68 | 55 | 34 | 16 |

Inoculated controls: Average disease rating of 4.5 on a zero (no disease) to 5 (100% diseased) scale based on 3 replicates.

*The results with the compound at 12 lbs/acre indicated that there was an error in the experiment.

It is apparent from the above data that ethyl N-chloro carbamate is more effective at lower concentrations and has a slower rate of loss of activity with decreasing concentration than Captan, the commercial standard.

Ovicidal Activity:

The toxicity of ethyl N,N-dichloro-carbamate, ethyl N-chloro-carbamate and the commercial standard (Sesoxane) as a topical treatment to milkweed bug eggs was tested. The results revealed greater activity by ethyl N-chloro-carbamate at 300 ppm and equal activity by ethyl N,N-dichloro-carbamate as compared to Sesoxane (2-(3,4-methylenedioxy-phenoxy)-3,6,9-trioxoundecane) the commercial standard. Toxicity of ethyl N,N-dichloro-carbamate and ethyl N-chloro-carbamate to milkweed bug eggs:

| Compounds | Conc. ppm | % Response Type Response* |
|---|---|---|
| ethyl N,N-dichloro-carbamate | 1200 | 100:8, 10 |
| | 300 | 90:8, 10 |
| | 75 | 0:0 |
| ethyl N-chloro-carbamate | 1200 | 100:10, 8 |
| | 300 | 100:8, 10 |
| | 75 | 0:0 |
| Sesoxane (commercial Standard) | 1200 | 100:8 |
| | 300 | 90:4, 8 |
| | 75 | 20:4 |
| Untreated controls | | 0:0 |

*Insect growth regulant response
4. Incomplate molt
8. No molt
10. Toxic

What is claimed is:

1. A method of destroying insects comprising applying to said insects an insecticidally effective amount of an N-chloro compound of the formula

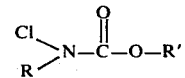

where R is chlorine, hydrogen or alkyl of 1 to 6 carbon atoms, and wherein R' is alkyl of 1 to 6 carbon atoms.

2. The method according to claim 1 wherein the insects are in the egg stage.

3. The method according to claim 2 where R is chlorine, hydrogen or alkyl of 1 to 2 carbon atoms and R' is alkyl of 1 to 4 carbon atoms.

4. The method according to claim 3 wherein R' is alkyl of 1 to 2 carbon atoms.

5. The method according to claim 4 wherein R is hydrogen.

6. The method according to claim 4 wherein R is chlorine.

7. A method of destroying fungi comprising applying to the fungi a fungicidally effective amount of an N-chloro compound of the formula:

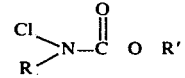

where R is chlorine, hydrogen or alkyl of 1 to 6 carbon atoms, and wherein R' is alkyl of 1 to 6 carbon atoms.

8. The method according to claim 7 wherein R is chlorine, hydrogen or alkyl of 1 to 2 carbon atoms and R' is alkyl of 1 to 4 carbon atoms.

9. The method according to claim 8 wherein R' is alkyl of 1 to 2 carbon atoms.

10. The method according to claim 9 wherein R is hydrogen.

11. The method according to claim 9 wherein R is chlorine.

12. The method according to claim 7 wherein the fungi are in the soil and there is applied to the soil a fungicidally effective amount of the N-chloro compound.

* * * * *